Figure 1:
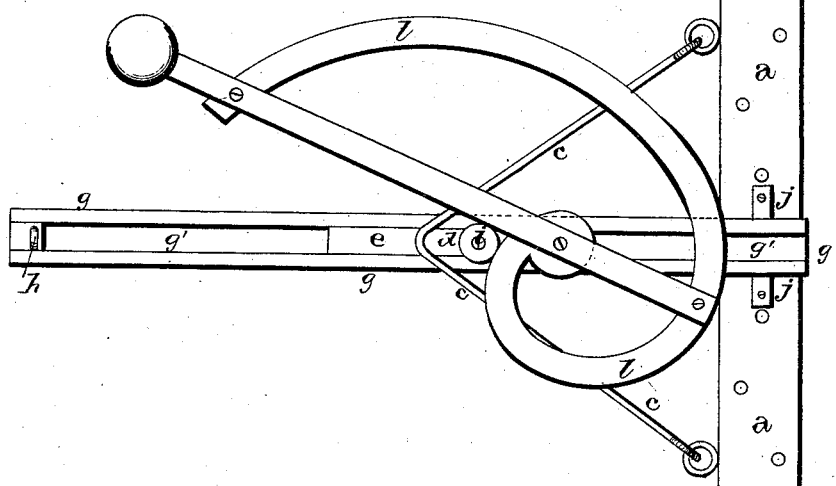
Figure 2:
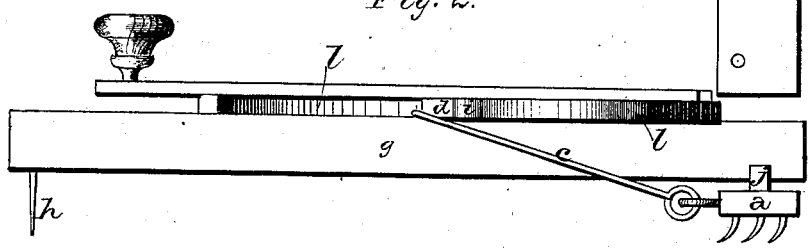

H. GOSS.
Carpet-Stretcher.

No. 168,633.

Patented Oct. 11, 1875.

WITNESSES.
J. W. Garner
Jno. Irwin Jr

INVENTOR.
Henry Goss
per
F. A. Lehmann, Atty.

N. PETERS, PHOTO-LITHOGRAPHER, WASHINGTON, D.C.

UNITED STATES PATENT OFFICE.

HENRY GOSS, OF UNION CITY, PENNSYLVANIA, ASSIGNOR OF ONE-HALF HIS RIGHT TO R. H. FRISBEE, OF SAME PLACE.

IMPROVEMENT IN CARPET-STRETCHERS.

Specification forming part of Letters Patent No. 168,633, dated October 11, 1875; application filed August 14, 1875.

*To all whom it may concern:*

Be it known that I, HENRY GOSS, of Union City, in the county of Erie and State of Pennsylvania, have invented certain new and useful Improvements in Carpet-Stretchers; and I do hereby declare the following to be a full, clear, and exact description of the invention, such as will enable others skilled in the art to which it pertains to make and use it, reference being had to the accompanying drawings, which form part of this specification.

My invention relates to an improvement in carpet-stretchers; and it consists in the arrangement and combination of devices that will be more fully described hereafter, whereby the carpet can be quickly and easily stretched.

The accompanying drawings represent my invention.

$a$ represent a strip of wood, having a number of sharp projections projecting in a zigzag manner from its under side, so as to catch in the carpet. Attached to the front edge of this strip or bar is the triangular bail $c$, that catches over the projection $d$ on the slide $e$. This slide moves back and forth in the dovetailed groove $g'$, made in the top of the rod or bar $g$, and has either a friction-roller, $i$, or a pinion pivoted on its rear end. The rod $g$ has a staple, $h$, driven down through its front end to fasten it to the floor, and has its rear end supported upon the top of the rake $a$, and held between a guide, $j$. Pivoted at any suitable point on the rod $g$ is the scroll-shaped cam $l$, made of metal, and having either a smooth outer edge, to bear against the friction-roller $i$, or a cogged edge to mesh with the pinion when the pinion is used.

By turning this cam toward the right the slide is pushed along in the groove, drawing the carpet along with it toward the staple $h$ at the wall.

Where the pinion and cogs are used and a small dog to hold the cam or eccentric or slide in any desired position, there is no danger of the carpet slipping back as soon as the cam is released.

The friction-roller may be dispensed with when it is so desired, and the cam bear directly against the end of the slide.

Having thus described my invention, I claim—

The combination of a rake, $a$, bail or cord $c$, and slide $e$ with a rod, $g$, and operating device $l$, substantially as shown.

In testimony that I claim the foregoing I have hereunto set my hand this 29th day of July, 1875.

HENRY GOSS.

Witnesses:
WM. C. JACKSON,
P. COLEMAN.